INVENTORS
LEONARD O. CARLSEN
HERMAN A. MALE
BY
Richard W. Treverton
ATTORNEY

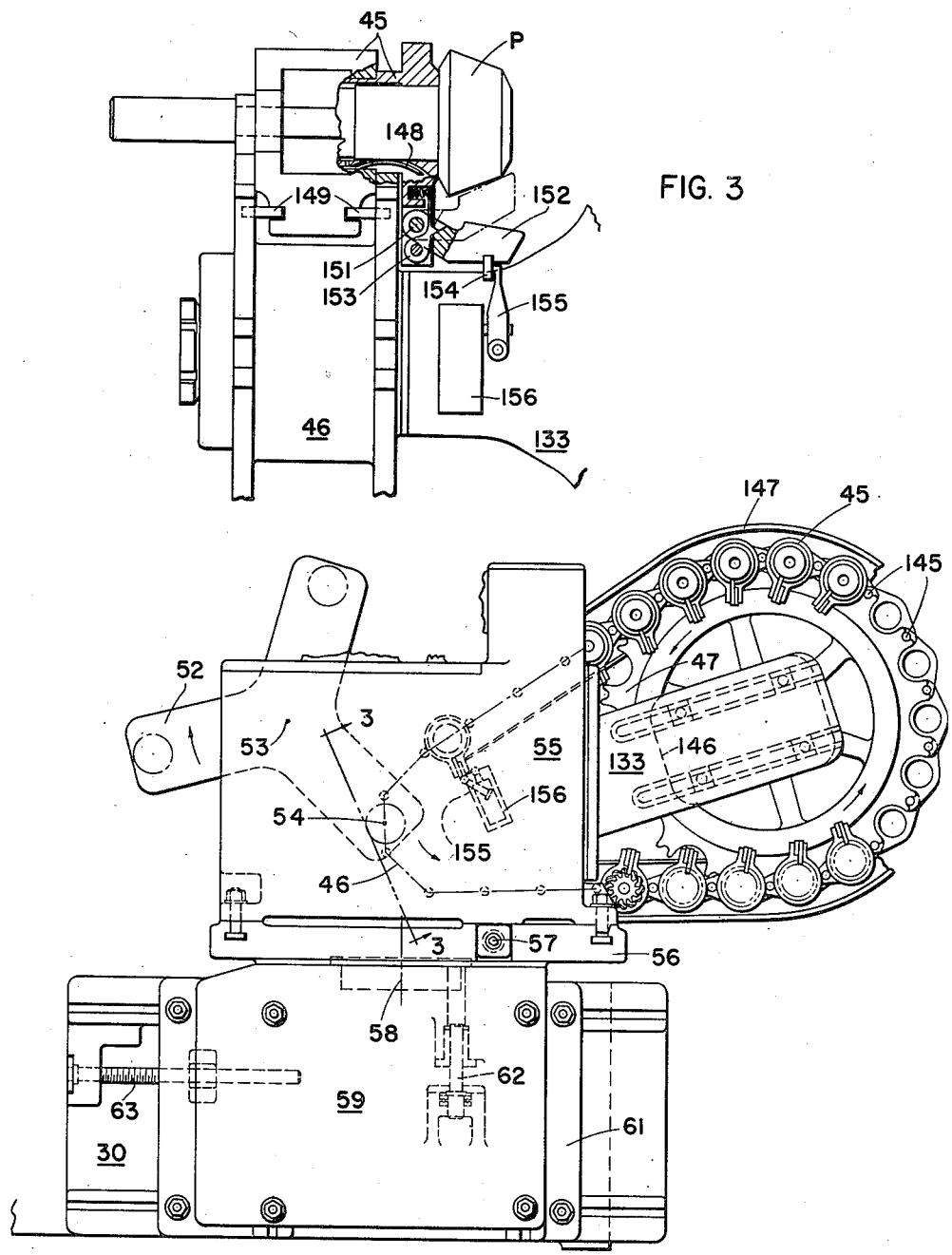

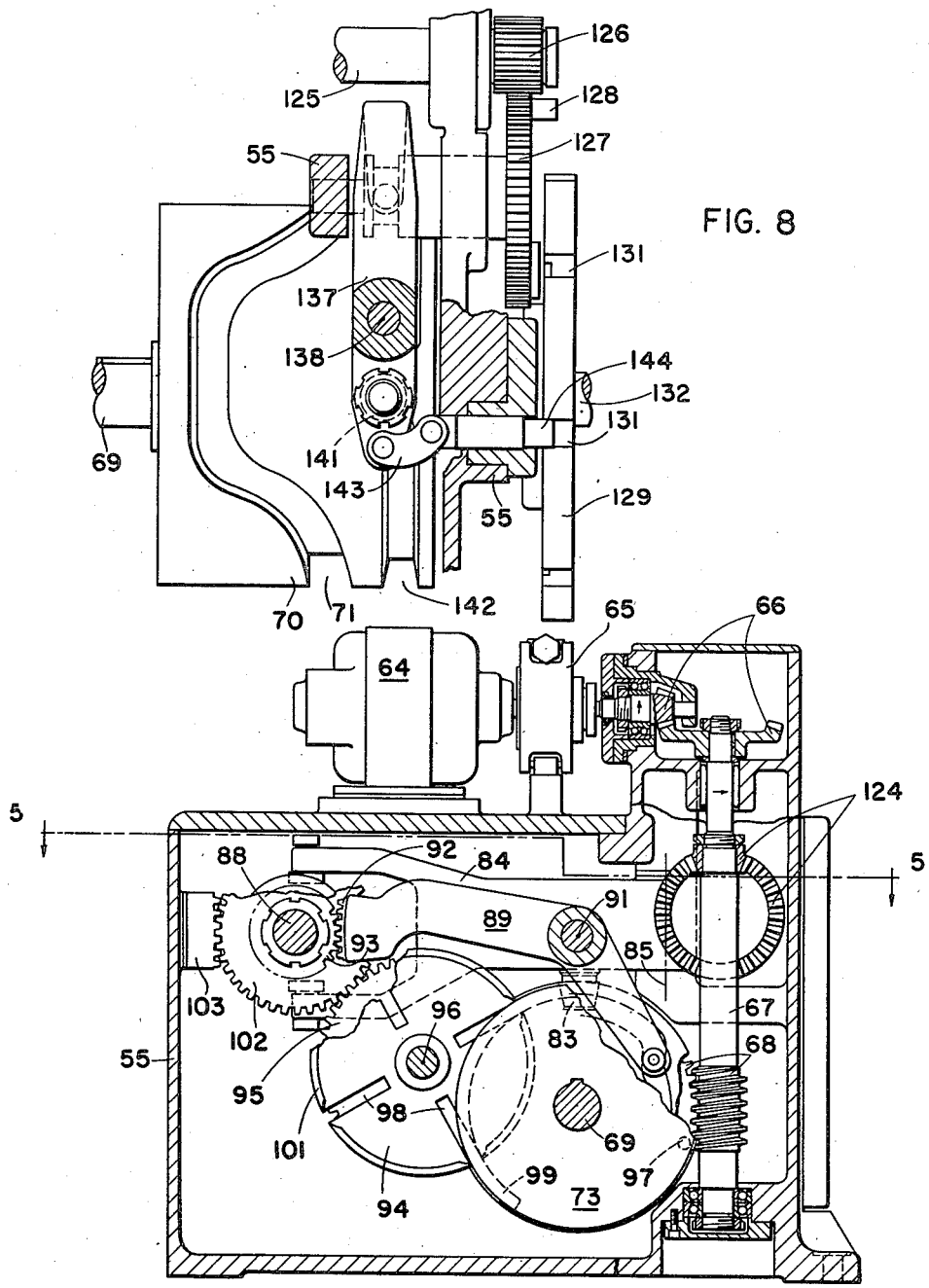

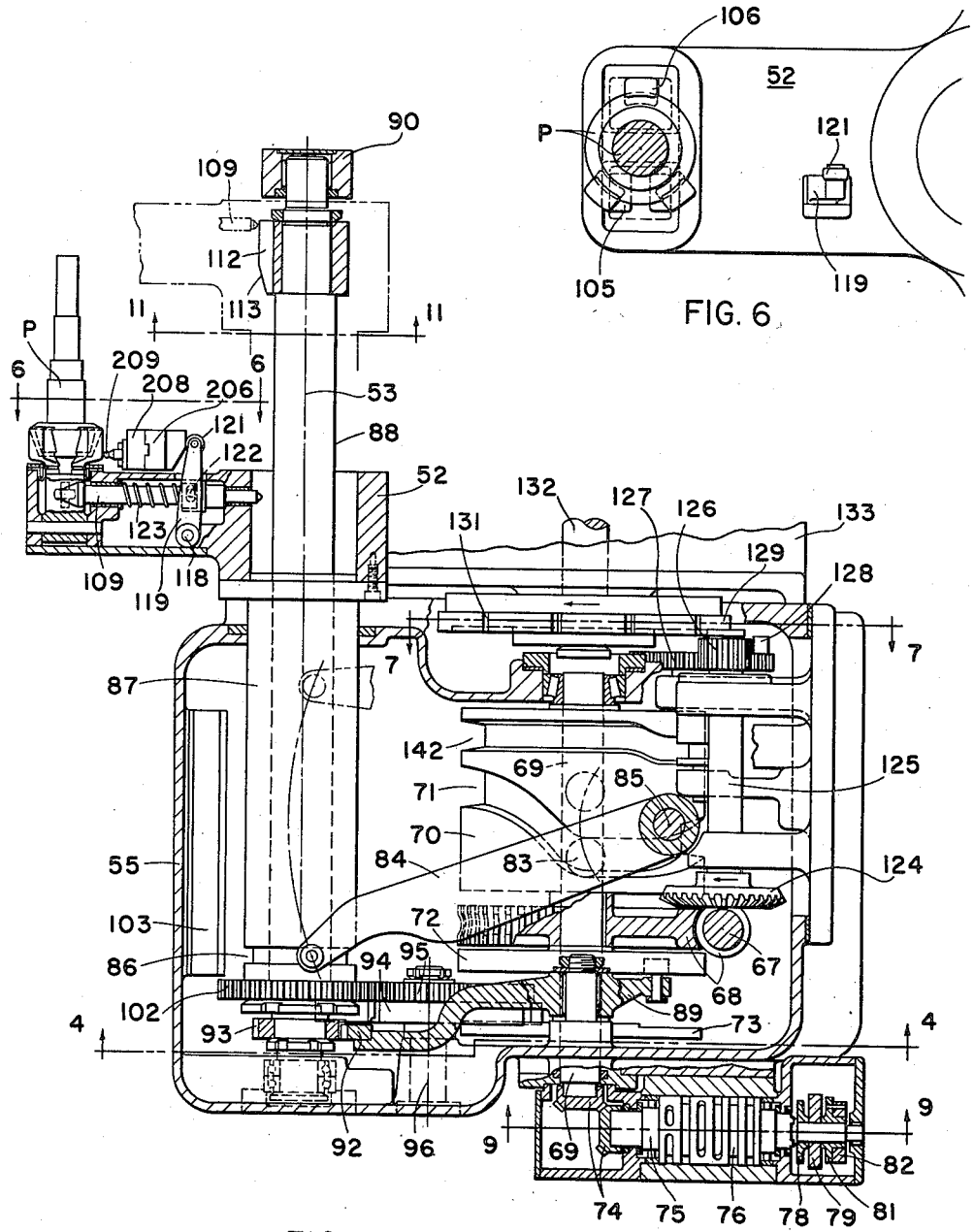

Feb. 26, 1957 L. O. CARLSEN ET AL 2,782,689
GEAR CUTTING MACHINE WITH AUTOMATIC LOADER
Filed Oct. 18, 1954 10 Sheets-Sheet 5
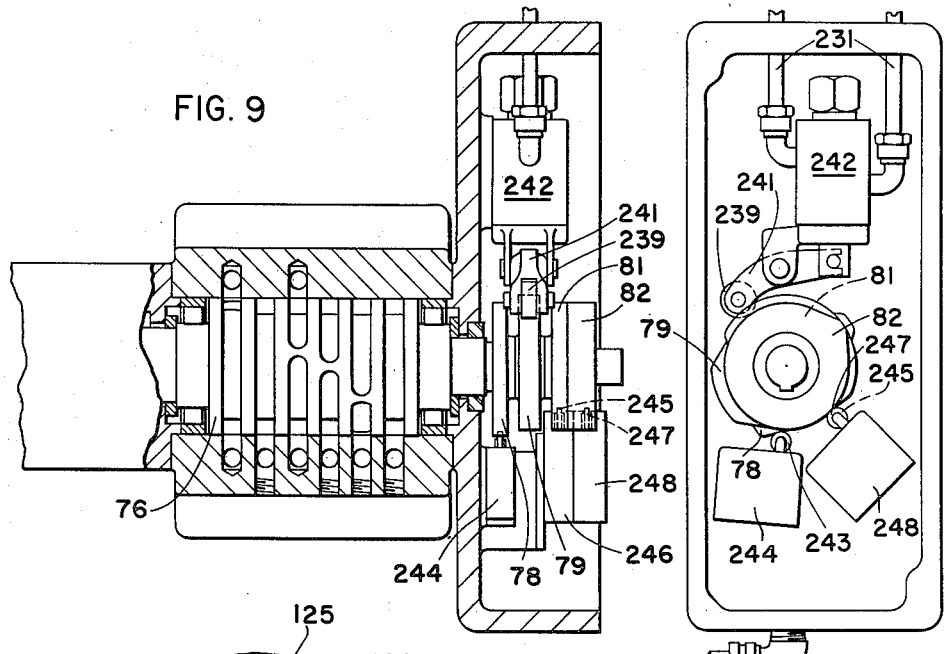
FIG. 9
FIG. 10
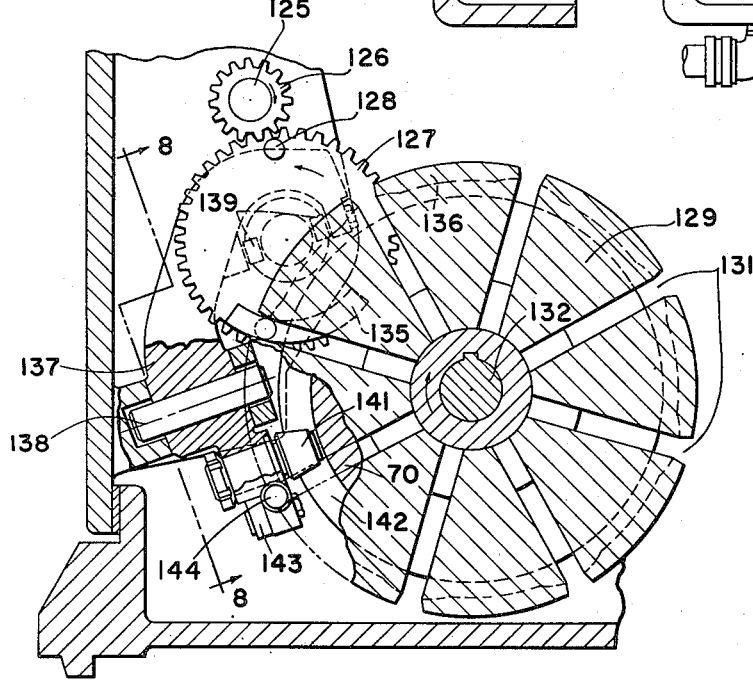
FIG. 7
INVENTORS
LEONARD O. CARLSEN
BY HERMAN A. MALE
Richard W. Treverton
ATTORNEY Feb. 26, 1957　　　L. O. CARLSEN ET AL　　　2,782,689
GEAR CUTTING MACHINE WITH AUTOMATIC LOADER
Filed Oct. 18, 1954　　　　　　　　　　　　　　　　10 Sheets-Sheet 6
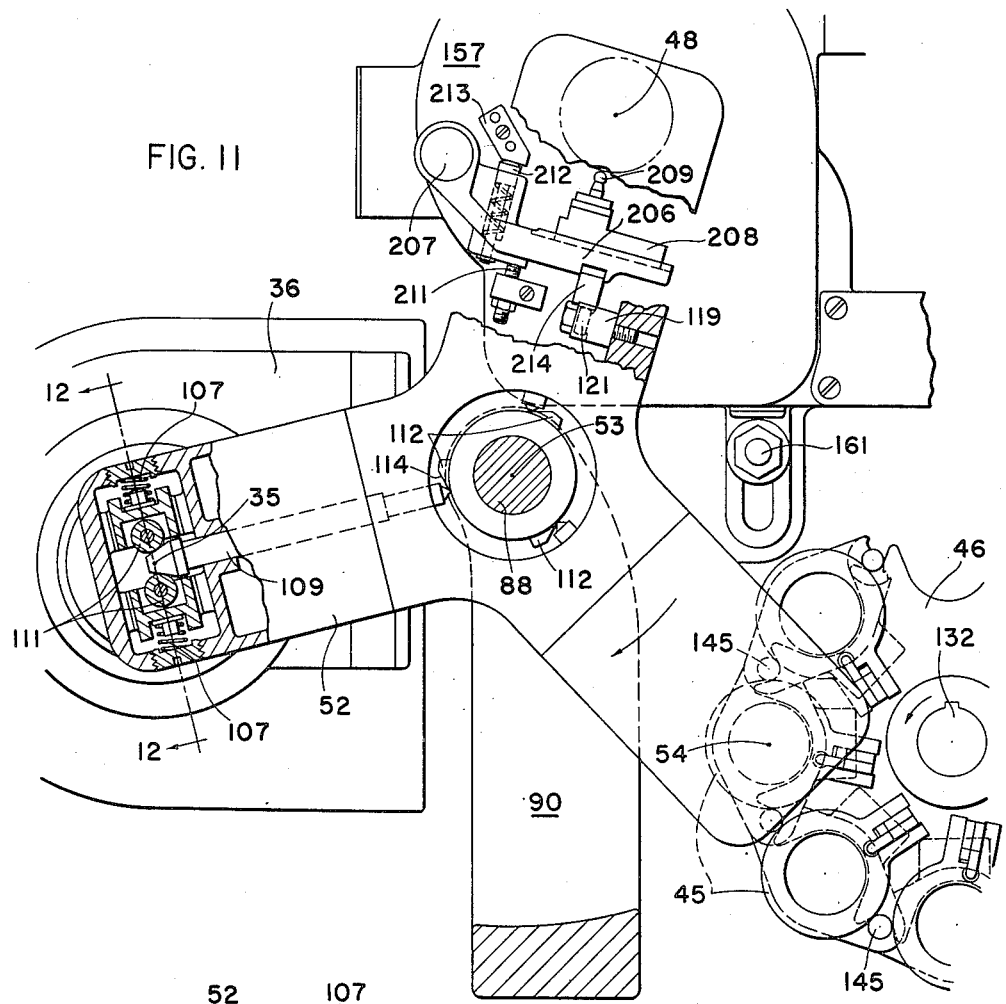
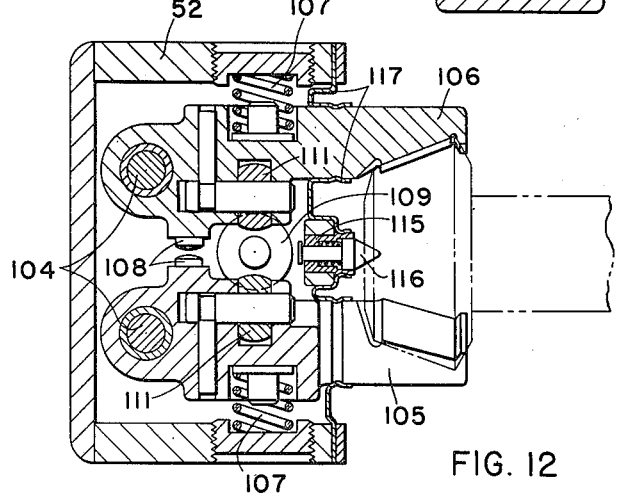
INVENTORS
LEONARD O. CARLSEN
HERMAN A. MALE
BY
Richard W. Treverton
ATTORNEY Feb. 26, 1957   L. O. CARLSEN ET AL   2,782,689
GEAR CUTTING MACHINE WITH AUTOMATIC LOADER
Filed Oct. 18, 1954   10 Sheets-Sheet 7

INVENTORS
LEONARD O. CARLSEN
BY HERMAN A. MALE

Richard W. Treverton
ATTORNEY

INVENTORS
LEONARD O. CARLSEN
HERMAN A. MALE
BY
Richard W. Treverton
ATTORNEY

Feb. 26, 1957   L. O. CARLSEN ET AL   2,782,689
GEAR CUTTING MACHINE WITH AUTOMATIC LOADER
Filed Oct. 18, 1954   10 Sheets-Sheet 9

INVENTORS
LEONARD O. CARLSEN
BY HERMAN A. MALE
*Richard W. Treventon*
ATTORNEY

INVENTORS
LEONARD O. CARLSEN
BY HERMAN A. MALE
Richard W. Treverton
ATTORNEY

United States Patent Office 2,782,689
Patented Feb. 26, 1957

2,782,689

GEAR CUTTING MACHINE WITH AUTOMATIC LOADER

Leonard O. Carlsen, Rochester, and Herman A. Male, Brighton, N. Y., assignors to The Gleason Works, Rochester, N. Y., a corporation of New York Application October 18, 1954, Serial No. 462,660

13 Claims. (Cl. 90—1)

The present invention pertains to a machine tool having an automatic loading mechanism, and relates especially, but not exclusively, to machines for cutting gears.

According to the preferred form of the invention the machine includes a magazine having a plurality of carriers, each adapted to hold a workpiece, and means to periodically index the magazine to bring the carrier successively into a work transfer position wherein the workpiece supported thereby is in a predetermined spaced, parallel relation to the axis of the spindle which supports the workpiece during the tooth cutting or other work operation. The machine further includes a transfer member which has a plurality of sets of work-gripping jaws, one set for gripping a workpiece on the spindle and another set for simultaneously gripping a workpiece on the carrier in work transfer position. The transfer member is rotatable about and translatable along an axis parallel to the work spindle axis, and hence is adapted to advance and retract axially to engage, grip and then withdraw workpieces from the spindle and the carrier, then to rotate through a part of a revolution and again advance axially to bring the workpieces respectively to the spindle and to the carrier, and, finally, to again withdraw to a position clear of the workpieces in order that the work operation and magazine indexing functions may proceed.

The invention further provides a chamfering device which includes a workpiece-supporting spindle and an arm carrying one or more tools for chamfering the ends of the teeth of a workpiece subsequent to a tooth cutting operation. The spindle is so disposed, parallel to the axis of the transfer member, that one set of jaws of the transfer member is engaged with a workpiece on the spindle when other sets engage workpieces respectively on the carrier and on the cutting work spindle. Preferably there are three sets of such jaws and the transfer member on each rotation turns through 120° so that a workpiece is progressively transported from a carrier to the cutting work spindle, then to the chamfering work spindle, and is finally returned to a carrier.

The foregoing and other aspects of the invention, and the advantages thereof, will be explained further in the following description made with reference to the drawings, wherein:

Fig. 2 is a front view of the loader, taken approximately in the plane 2—2 of Fig. 1;

Fig. 3 is a fragmentary elevation, partly in section, showing parts of the loader magazine as they appear when viewed from the plane 3—3 of Fig. 2;

Fig. 4 is a vertical sectional view through the loader, in planes 4—4 of Figs. 1 and 5;

Fig. 5 is a horizontal sectional view through the loader in the plane 5—5 of Fig. 4;

Fig. 6 is a detail view of one arm of the loader transfer member, with the workpiece therein appearing in section in plane 6—6 of Fig. 5;

Fig. 7 is a vertical section in approximately plane 7—7 of Fig. 5, showing the index mechanism for the chain magazine of the loader;

Fig. 8 is a sectional view in planes 8—8 of Fig. 7;

Fig. 9 is an axial sectional view through a control valve and electric switch mechanism associated with the loader;

Fig. 10 is an end elevation of the mechanism shown in Fig. 9;

Fig. 11 is a sectional view in the plane 11—11 of Fig. 5, showing the transfer member;

Fig. 12 is a sectional view in plane 12—12 of Fig. 11, showing details of the loader jaws;

*General arrangement and operation*

Figure 1:
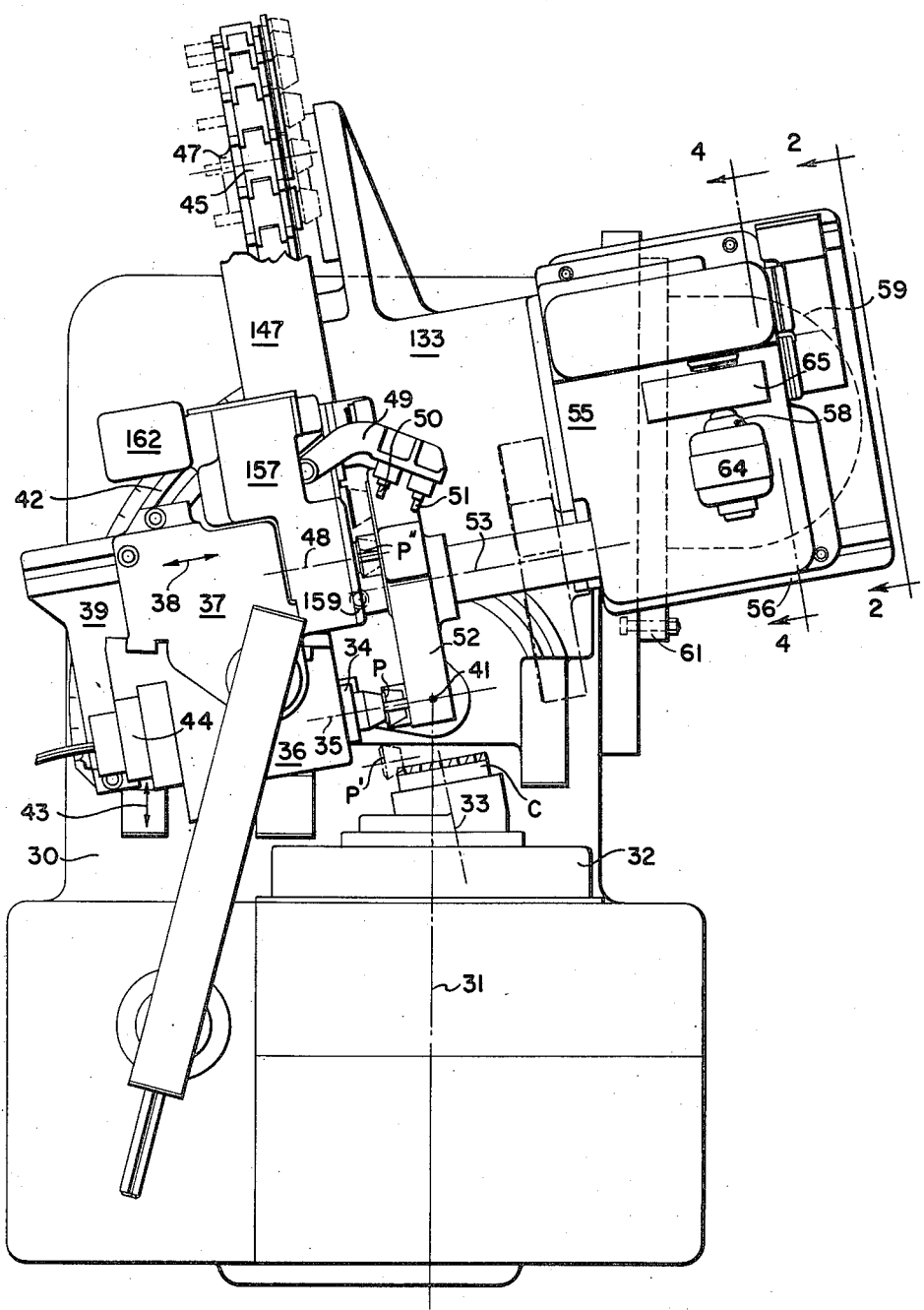
Fig. 1 is a plan view of the complete machine.

The invention is illustrated as applied to a conventional type of bevel gear cutting machine. The machine, which may be of the type described in Patent No. 2,667,818, granted February 2, 1954, has a frame 30 on which there is mounted for rotation about horizontal axis 31 a cradle 32. Journaled for rotation on the cradle about axis 33 is a face mill cutter C for cutting the teeth of a spiral bevel pinion P that is mounted on a work spindle 34, this spindle being journaled for rotation about axis 35 in a work head 36. The work head is adjustable vertically on a work head column 37, and the latter is adjustable horizontally in the direction of arrows 38 on a swinging base 39 which in turn is adjustable upon a sliding base 42 about vertical axis 41 which intersects the horizontal cradle axis 31. The sliding base is adjustable horizontally on the machine frame 30 in the direction of arrows 43, and it is also movable in this direction by a hydraulic cylinder and piston unit to carry the workpiece P between the position shown in full lines, which is its loading position, and the broken line position shown at P', which is its cutting position. By the several adjustments to which reference has been made a work gear of any size and shape within the capacity of the machine may be brought into the proper relation for having its teeth cut by the cutter C. The machine includes a suitable chuck for clamping the shank of the work pinion P to the cutting work spindle 34, the chuck being operated by a hydraulic actuator 44.

The machine also includes a main drive motor which rotates the cutter about axis 33 and also oscillates the cradle and the pinion P in timed relationship to each other about their respective axes 31 and 35 during the cutting operation, there being one such oscillation for the cutting of each tooth space of the pinion. The machine further includes an automatic indexing mechanism, which operates at the conclusion of each such oscillation to advance the pinion about its axis so that another tooth space will be cut during the succeeding oscillation; and it also includes a mechanism which automatically withdraws the sliding base 42 far enough that the work clears the cutter during the indexing action. Still further the machine includes an automatic mechanism for stopping it at the conclusion of the generating cycle during which the last tooth space is cut.

According to the present invention the loader includes a magazine mounted on the machine frame 30 for holding a number of workpieces. This magazine comprises an endless chain of carriers 45 running over a drive sprocket 46 (Figs. 2 and 11) and an idler sprocket 47. Mounted on the machine work column 37 is a device for chamfering the ends of the pinion teeth, this device comprising a work spindle rotatable on axis 48 of the pinion P″ being chamfered and a swinging arm 49 carrying tools 50 and 51 for respectively chamfering the sharp edges at the large and small ends of the pinion teeth. Mounted on the machine frame 30 there is also a loader transfer mechanism, comprising a multi-armed member 52 which is indexible step-by-step about axis 53 and is also movable along this axis. As will appear from Figs. 1 and 11, when the machine is in its loading position the axes 35 and 48 of the spindles of the cutting machine and the chamfering device, and the axis 54 of one carrier 45, are parallel to and are in a circle around the axis 53. Each arm of member 52 has jaws for gripping the workpieces.

In operation the transfer member 52 advances along its axis 53 to cause its jaws to envelop three workpieces, one of which is a blank or uncut pinion on axis 54, another of which is a cut pinion on axis 35 of the cutting work spindle, and the third of which is a cut and chamfered pinion on the axis 48 of the chamfering work spindle. The jaws close to grip the three workpieces. The transfer member withdraws along its axis, and, when the pinion shanks are clear, rotates through 120° to advance the workpieces by one station. It then advances along its axis to insert the blank pinion in the chuck of the cutting work spindle, the cut pinion in the chuck of the chamfering work spindle, and the cut and chamfered pinion in the carrier 45. The jaws release the workpieces which are by now respectively grasped by the chucks of the work spindles and gripping means on the carrier 45. The transfer member now retracts axially and the chain magazine is indexed to bring a carrier containing a new blank to the transfer position represented by axis 54, thus completing a loading cycle. While the chain magazine is indexing, the sliding base 42 moves in to cutting position and a cutting cycle ensues. At the same time the chamfering device operates through its cycle to chamfer the ends of all of the teeth of the workpiece on its spindle. When these operations have been completed a new loading cycle follows automatically, then another cutting and chamfering cycle, and so on. This sequence will ordinarily continue until the machine is stopped for cutter resharpening. The operator need only to periodically remove several completed workpieces from the chain magazine and replace them with blank workpieces.

*The loader*

This mechanism has a main housing 55 that is adjustable on a table 56, in a horizontal direction perpendicular to cradle axis 31, by means of a screw 57, Fig. 2. The table is adjustable angularly, about vertical axis 58, on a bracket 59 which in turn is adjustable vertically on a plate 61 by means of a screw 62. Plate 61 is adjustable horizontally on the machine frame 30, in a direction parallel to cradle axis 31, by turning a screw 63. By these adjustments the axes 48, 53 and 54 may be brought into the relationship to axis 35 that is shown in Figs. 1 and 11.

Mounted on housing 55 is a loader motor 64 and magnetic clutch-brake unit 65. This unit acts to declutch the motor and brake the shaft driven by the motor whenever the motor is deenergized. Through bevel gears 66, vertical shaft 67, and worm and worm wheel 68 (Figs. 4 and 5) the motor drives a horizontal shaft 69. On this shaft are a cam 70 having a track 71 which effects the motion of transfer member 52 along its axis 53, a cam 72 which controls the action of the work gripping jaws on the transfer member, and a drive disc 73 of an index mechanism for periodically advancing or indexing the transfer member angularly through 120°. Through bevel gears 74 the shaft 69 also drives a shaft 75 which carries a hydraulic sequence control valve 76 and cams 78, 79, 81 and 82 which control various other machine functions that will be described later. As shown the valve 76 has a number of ports in its cylindrical surface, each such port registering during at least one phase of the valve's rotation with a mating port in the surrounding valve casing.

Cam track 71 acts on a follower roller 83 carried by a lever 84 to swing the latter about a vertical axis 85. The free end of the lever is forked and carries rollers engaging in an annular groove 86 in a tubular support 87 for the transfer member 52. This support 87 is supported for axial motion and rotation by a telescoping shaft 88 and by the housing 55. As shown, shaft 88 is supported on anti-friction bearings by the housing 55 and an outboard support 90 that is rigid with the housing.

Cam 72 acts on a follower roller carried by a lever 89 to rock the lever about horizontal axis 91, Fig. 4. On the free end of the lever is a gear segment 92 meshing with a pinion 93 affixed to shaft 88, for oscillating the latter about axis 53.

A drive disc 73 intermittently rotates a driven plate 94, and a gear 95 carried by the latter, about horizontal axis 96. For this purpose the disc 73 carries a drive pin 97 which on each rotation of the disc enters into one of four radial slots 98 in plate 94 and turns the latter through ninety degrees. Disc 73 also has an arcuate ridge 99 which engages between the ends of adjacent arcuate ridges 101 on the plate 94 to hold the latter against rotation when pin 97 is not engaged in a slot 98. Gear 95 drives a pinion 102 secured to tubular support 87, to rotate the transfer member 120° for each 90° rotation of plate 94. When the lever 84 moves support 87 axially from the full line position to the broken line position thereof shown in Fig. 5, the pinion 102 is thereby disengaged from gear 95 (which is stationary at this time) but it engages an elongated rack 103 on the housing which holds it against rotation.

Mounted on parallel pivot pins 104 on each arm of the transfer member 52 are a pair of work gripping jaws 105, 106, Figs. 5, 6, 11 and 12. These jaws are similar except that 105 has a pair of work-engaging parts while 106 has only one, as is best shown in Fig. 6. The jaws are urged together by springs 107 toward a limit position determined by stops 108. They are opened by an expander 109 whose conical head engages a roller 111 on each jaw. One such expander is movable radially on each of the three arms of the transfer member. When the latter is in its advanced position, shown in broken lines in Fig. 5, the expanders are engaged with cam formations 112 on a member carried by shaft 88. When the latter is rotated surfaces 114 of formations 112 cam the expanders outwardly to open the jaws. The same jaw-opening action occurs if the transfer advances axially when the shaft 88 is already rotated to this position except that in this case the expanders ride on cam surfaces 113 of formations 112.

Mounted in each arm of the transfer member is a bushing 115 carrying a spring-backed center 116 whose nose enters a centering recess in the workpiece, to center the latter in the jaws. Flexible seals 117 around the jaws serve to exclude chips and other foreign matter from the jaw-actuating parts 109, 111, etc.

Also fulcrumed on each arm of the transfer member 52 at 118 is a lever 119 carrying a roller 121 at its free end. The lever is connected by a pin-and-slot connection 122 to the expander 109, which is urged radially inwardly by a compression spring 123. The purpose of the lever, which is related to the chamfering device, will be described later.

The drive for the magazine, Figs. 4, 5, 7 and 8, is from motor 64 through bevel gears 124 connecting vertical-shaft 67 to horizontal shaft 125, a pinion 126, and a gear 127 driven by the pinion. On the gear is a drive pin 128 of a Geneva type index mechanism which includes a driven wheel 129 having radial slots 131 in which the pin intermittently engages. The wheel is mounted on shaft 132 which is journaled for rotation in extension 133 of housing 55 and which carries the drive sprocket 46, Fig. 11, of the magazine. The gear 127 has an arcuate ridge 135 which is diametrically opposed to pin 128 and is adapted to engage between the ends of adjacent ridges 136 on wheel 129. The shank of gear 127 is journaled for rotation and also for axial motion in housing 55. This axial motion carries the pin 128 to and from the plane of slotted wheel 129, and is effected by a lever 137 which is fulcrumed on axis 138 to the housing. The lever has rollers 139 engaging in an annular groove in the shank of gear 127 and also a roller 141 engaging a cam track 142 of cam 70. The lever is connected by a pivoted link 143 to a pin 144 that is slidable upon the housing 55 and engageable in the outer ends of slots 131 of wheel 129.

The gearing is such that the gear 127 makes a number of turns for each turn of the cam 70. During the major part of the rotation of cam 70, track 142 holds the lever 137 in such position that pin 144 is engaged in one of slots 131 and pin 128 is held away from the plane of wheel 129. Accordingly the chain magazine is held stationary and the pin revolves idly. However during one phase of the rotation of cam 70, track 142 acts through the lever to shift pin 128 into the plane of wheel 129 and to retract pin 144. Hence during the ensuing turn of gear 127 the pin 128 enters a slot 131 and rotates wheel 129 one-twelfth of a turn, which is just sufficient to advance the chain magazine by the length of one carrier link 45. The cam and lever then act to retract pin 128 and advance pin 144, again locking the magazine against motion. The timing is such that just before pin 144 is retracted from the slot 131 in which it has been engaged the ridge 135 on gear 127 engages between an adjacent pair of ridges 136 on the wheel 129, this occurring before pin 128 has entered a slot 131; and that after the pin 128 leaves the slot the pin 144 is advanced to engage in a slot 131 before the ridge 135 is disengaged from ridges 136. Thus the position of wheel 129 is always positively controlled, either by pin 144, or pin 128, or by ridges 135, 136.

The several carriers 45, Figs. 2, 3 and 11, which comprise the links of the magazine chain, are pivoted together by pins 145, and the flanges of the drive sprocket 46 and idler sprocket 47 have small recesses to seat the ends of these pins as well as larger recesses to seat the bodies of the carriers. Sprocket 47 is rotatable on a block 146 which is adjustable on housing extension 133 to take up slack in the chain. A guard 147 extends over the chain, leaving open the face of the chain that appears in Fig. 2, so that workpieces P may be inserted and removed from the carriers while they are on the idler sprocket. Each carrier has a bore for receiving the shank of a workpiece, and extending into this bore is a leaf spring 148 for frictionally engaging the shank to hold it in the carrier. Rollers 149 on each carrier engage the flanges of the sprockets to control the position of the carrier in a directed axial of the workpiece.

Pivoted at 151 to each carried is a signal flag 152 which is retained in either the up position shown in broken lines in Fig. 3, or in the down position shown in full lines, by a spring-backed pivoted detent 153. The flag is raised manually by the machine operator at the time he loads a workpiece P in the carrier. When the transfer member 52 subsequently removes the workpiece the latter pushes flag to its down position where it remains until the operator subsequently replaces a cut workpiece in the carrier with an uncut or blank workpiece and again raises the flag. If there is a failure to carry out this operation then the flag, in its down position, engages roller 154 on a pivoted arm of 155 of an electric switch 156 that is mounted on housing extension 133. The resulting pivotal motion of arm 155 opens the switch and stops the machine, thus preventing the possibility of the machine twice performing a cutting operation on the same workpiece.

*The chamfering device*

Figure 20:
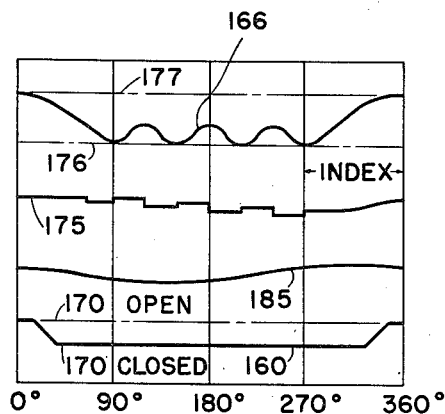
Fig. 20 is a diagram illustrating the operating cycle of the chamfering device.

The chamfering device, shown in Figs. 1, 11, and 16 to 19, comprises a housing 157 which is adjustable along a vertical way 158 on work head column 37 by means of adjusting screw 159, and is secured to the column by clamp bolts 161. Mounted on housing 157 is a chamfering drive motor 162 which through a gear reduction comprising a worm 163 and a wormwheel 164 rotates a cam 165. This cam is mounted in the housing on anti-friction bearings and has a peripheral cam track 166 for a roller 167, the latter being mounted on the inner end of chamfering arm 49. The two cutting tools 50 and 51 are adjustable on the arm so that they may be positioned to simultaneously chamfer the sharp edges at both the large and small ends of workpiece teeth. Thus tool 50 in its broken line position in Fig. 16 chamfers edge $p1$ at the large end of one tooth while tool 51 chamfers edge $p2$ at the small end of an approximately diametrically opposite tooth. See also Fig. 17. The arm is mounted on a shaft 168 which is journaled in the housing for both angular and axial motions, and is partially supported by a spring-backed axial thrust bearing 169. Axial (vertical) motion of the shaft 168 is controlled by a lever 171 which has a forked end carrying rollers that engage in an annular groove 172 in the shaft. The lever, which is fulcrumed on the housing by pin 173, also carries a roller 174 engaged in a peripheral track 175 of cam 165. The shape of tracks 166 and 175 of cam 165, and their effective phase relationship, is indicated in the diagram, Fig. 20. The cam makes one turn to completely chamfer the ends of each tooth. During this turn the track 166 effects four cutting strokes and four return strokes of the arm 49, the latter being in its forward position shown in broken lines in Fig. 16 at the points where track 166 touches line 176 in Fig. 20, and being fully retracted to its full line position in Fig. 16 where the track touches line 177 in Fig. 20. Preceding each cutting stroke the arm is fed axially by cam track 175, lowered in this case, so that the tools 50, 51 will remove stock from the work. Preceding each return stroke of the arm the track 175 effects an axial return feed so that the tools will clear the cut surfaces as they return. After the fourth cutting stroke track 166 swings the arm to its fully retracted position wherein it dwells while the work is indexed to bring successive teeth into position for chamfering; and the track 175 returns the arm axially to its initial raised position. As shown in Fig. 20 the first cutting stroke and the last return stroke of arm 49 are relatively long, to meet the requirement that the tools retract to a position clear of the path of the transfer member 52.

Figure 19:
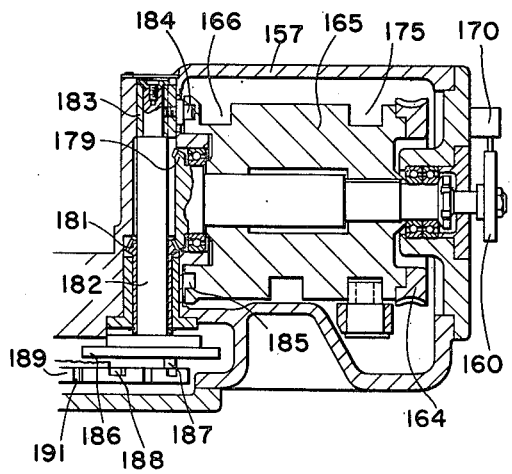
Fig. 19 is a horizontal sectional view taken in plane 19—19 of Fig. 17.

Rotating with cam 165, Fig. 19, is a cam 160 for operating a switch 170 for a purpose to be described later, and also a bevel gear 179 which drives a tubular pinion 181. This pinion is journaled for rotation in housing 157 and is splined to a shaft 182 which is both rotatable and axially movable. The shaft is journaled in a sliding block 183 which has a cam follower roller 184 in a continuous cam track 185 formed in the end face of cam 165. Affixed to the lower end of the shaft is a disc cam 186 carrying a Geneva index drive pin 187 which is periodically engageable in radial slots 188 of an index plate 189 which rotates as a unit with the workpiece P. The number of slots 188 corresponds to the number of teeth on the workpiece, and the plate also has a like number of notches 191 for receiving a lock dog 192 which is pivoted at 193 to the housing. The dog carries a roller 194 and is urged toward the index plate by a spring-backed plunger 195.

As shown in Fig. 20, while the chamfering arm 49 is being oscillated the roller 184 is in a dwell of cam track 185 which holds the shaft 182 in the position shown in Fig. 19 in which the cam disc 186 is offset from the plane of the dog-carried roller 194 and pin 187 is offset from the plane of index plate 189. Accordingly the parts 186, 187 rotate idly and spring means 195 holds dog 192 engaged in one of the index plate notches 191.

When the swinging motion of the arm is completed, i. e. during the portion of the cycle designated "INDEX" in Fig. 20, cam track 185 moves the shaft 182 axially, so that disc 186 and pin 187 are brought into the respective planes of roller 194 and plate 189. Accordingly during the next revolution of shaft 182 the pin enters a slot 188 and advances the plate and the workpiece by one circular pitch. Just before the pin commences to drive the index plate the cam 186 acts through roller 194 to lift the dog from recess 191, and just before the pin leaves the slot 188 the cam allows the dog to drop into the next notch. Each such indexing operation is succeeded by chamfering strokes of tools 50, 51, the motor 162 rotating the drive cam 165 continuously until all the teeth of the workpiece have been chamfered. At this time the main cam 165 has made as many revolutions as there are teeth on the workpiece, and a button 196, Figs. 17 and 18, on the index plate now acts through a pivoted arm 197 to open a switch 190 and thereby stop the motor.

Figure 16:
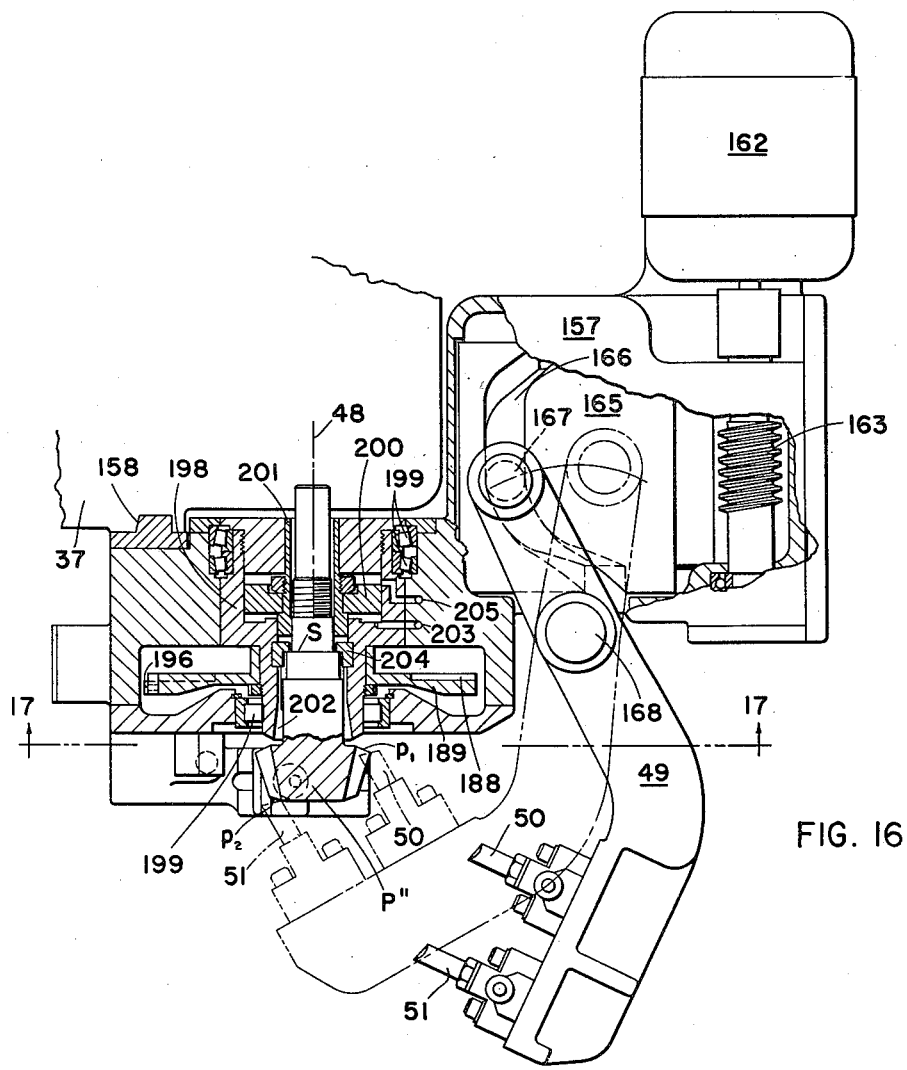
Fig. 16 is a plan view, partly in horizontal section, through the chamfering device.

As shown in Fig. 16, the index plate is secured to the chamfering device work spindle 198 which is rotatable in the housing 157 on anti-friction bearings 199. Slidable in a cylinder in the spindle is a piston 200 secured to a collet 201 which has a split outer end 202 having a conical outer surface and a cylindrical inner surface. This inner surface is adapted to receive the shank of the work pinion P" while the conical outer surface is received in a tapered bore of the spindle so that upon inward movement of the piston, effected by hydraulic pressure applied through passage 203, the split end of the collet is contracted to tightly grip the workpiece and draw its shoulder S firmly against a seat 204 in the spindle. Upon reversal of the hydraulic pressure, i. e. by applying it through passage 205, the piston and the collet 201, 202 are moved forwardly to free the workpiece. A suitable system, not shown, comprising a source of fluid under pressure and a reversing valve, is connected to the passages 203 and 205.

The transfer member 52 delivers cut workpieces P to the chamfering mechanism in approximately the correct position for chamfering, but to prevent accidents due to possible slight angular displacement of the workpiece in the course of its handling in the machine between the tooth cutting operation and chucking by collet 201, 202, the stock dividing mechanism shown in Fig. 11 is provided. This mechanism comprises an arm 206 pivoted at 207 to housing 157. Adjustable on the arm is a block 208 carrying a ball 209 adapted to enter into a tooth space of the workpiece and, by cam action against the tooth sides, rotate the workpiece about its axis into the proper position for the chamfering. This action of course takes place before the collet 201, 202 grips the workpiece. The arm 206 is normally urged away from the workpiece and against an adjustable stop 211 by a spring-backed plunger 212 which seats against a stop 213 on the housing. The opposite or stock-dividing motion of the arm is effected by lever 119 whose roller 121 engages cam block 214 on the arm. Thus when the expander 109 is moved radially outwardly, to open the jaws 105, 106 just after the workpiece has been inserted in collet 201, 202, the lever 119 is swung outwardly to effect stock-dividing motion of arm 206.

*Sequence control and protective means*

Figure 13:
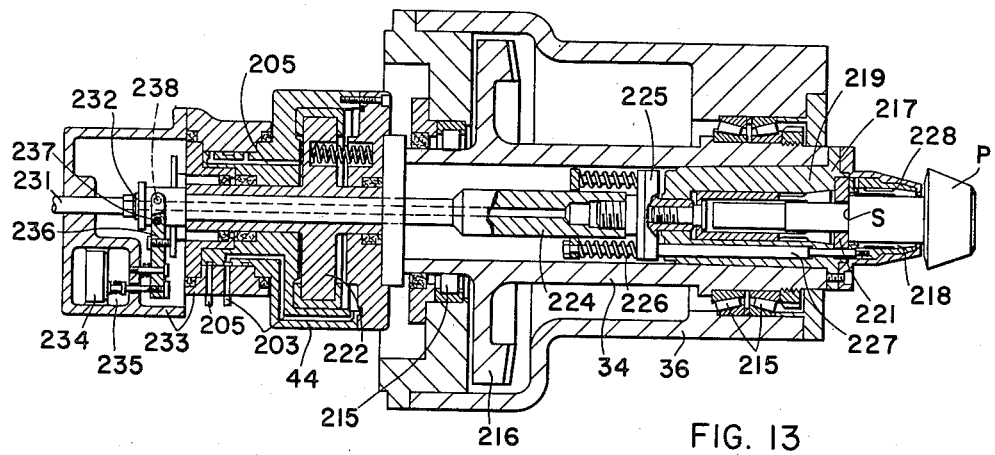
Fig. 13 is an axial sectional view through the cutting work spindle, showing the chucking mechanism and related parts thereof.

In Fig. 13 is shown the work spindle 34 of the gear cutting machine mounted on anti-friction bearings 215 in the work head 36 and including a gear 216 by which it is rotated. The shank of the workpiece P is received in a chuck which is carried by the spindle and includes a body 217, front and rear contractible split tapered collets 218 and 219 for gripping the shank, a seat 221 for a shoulder on the shank, and an actuating piston 222 which is moved rearwardly and forwardly (to the left and right in Fig. 13) to respectively chuck and dechuck the work. Rearward motion, which is effected by application of hydraulic pressure through line 203 against the right face of the piston, is transmitted through rod 224 and part 225, springs 226 and rods 227 to a contractor sleeve 228 for collet 218, thereby contracting the collet and drawing it rearwardly so that shoulder S of the workpiece is drawn firmly against seat 221. Upon continued motion of part 225 the tapered collet 219 is moved rearwardly in the surrounding tapered bore of body 217 and is thereby contracted to grip the workpiece.

Upon forward motion of piston 222, by application of pressure through hydraulic line 205, the collets 218 and 219 release the workpiece. As shown, an air line 231 is connected by a swivel joint 232 to the piston rod. This line communicates with the interior of collet 219 through a passage through the piston rod, draw rod 224 and part 225, for a purpose to be explained hereinafter. The cylinder for piston 222 is rotatable as a unit with the spindle 34, and the hydraulic lines 203 and 205 communicate with the opposite ends of the cylinder chamber through passages in a non-rotating swivel housing 233. In this housing are limit switches 234 and 235 which are operated by a lever 236. This lever is pivoted at 237 to housing 233 and at 238 to the swivel connection 232. Switch 234, normally open, is closed when the piston 222 reaches its forward (dechucking) limit position. Switch 235 is normally closed and opens only if the piston moves abnormally far to the left during its chucking stroke, this abnormality indicating that the workpiece has not been properly chucked, usually due to its shank diameter being excessively oversize or undersize.

Referring to Figs. 5, 9 and 10, the cam 79 acts through a follower roller 239 and its supporting lever 241 to actuate a valve 242 in air line 231 which extends from a suitable source of compressed air. The came 79 is so shaped and positioned that it opens valve 242 to cause a blast of air through the bore of the chuck in work spindle 34 at the moment a workpiece is being inserted therein and again when the workpiece is being withdrawn. These blasts of air serve not only to clear the bore of the chuck of chips and other foreign matter but also serve to remove such matter from the shank of the workpiece.

Figure 14:
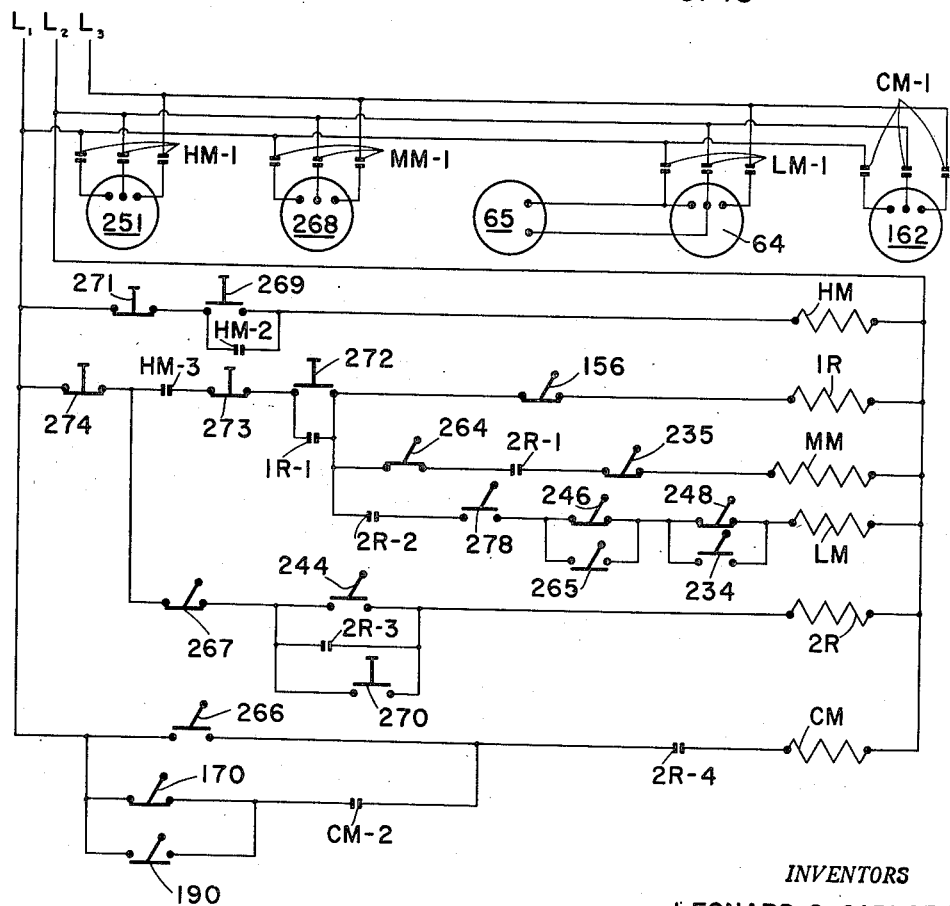
Fig. 14 is a wiring diagram of the machine.

Cam 78 acts on follower 243 of a limit switch 244, also shown in the wiring diagram Fig. 14, to momentarily close the switch at the end of each loading cycle, i. e. the end of each revolution of cam 70. Cam 81 acts on follower roller 245 of limit switch 246 to delay one phase of the loading cycle until the sliding base is fully withdrawn; and cam 82 acts on follower roller 247 of limit switch 248 to delay another phase of the loading cycle until dechucking is completed.

Other apparatus for controlling the machine includes a hydraulic pump 249 operated by a motor 251 for withdrawing hydraulic fluid from sump 250 and directing it into port 253 of valve 76, this port being in continuous communication with ports 254, 255, 256 and 257 of the valve. Exhaust fluid is returned to the sump from port 258 which is in continuous communication with exhaust ports 259, 261, 262 and 263 of the valve. In the development of the valve shown in Fig. 15 the pressure ports are shaded whereas the exhaust ports are not. The controlling apparatus further includes normally open limit switches 264 and 265 which are closed by the sliding base 42 when in its advanced and withdrawn positions, respectively; a normally open switch 266 which is momentarily closed as the sliding base approaches its fully advanced position; and an automatic stop switch 267 operated by the cutting machine drive mechanism, including a main drive motor 268. As is conventional this stop switch is operated by a cycle counting mechanism, not shown, and opens momentarily, then recloses, when the machine has operated through a number of cutting cycles corresponding to the number of teeth to be cut on the workpiece.

The controlling apparatus further includes a controller for each of the four motors, the controller winding of the main motor 268 being designated as MM, that for the hydraulic pump motor 251 as HM, that for the loader motor 64 and its clutch-brake 65 as LM, and that for the chamfering motor 162 as CM. The contacts of each controller, all of which are closed only when the controller winding is energized unless otherwise noted, are designated by the letters of the winding plus a numeral. Thus the contacts of the hydraulic pump motor controller are designated HM-1, HM-2 and HM-3. There is also a relay having a winding 1R and a contact 1R-1 which is closed only when the winding is energized; and a relay 2R having contacts 2R-1, 2, 3 and 4. Of the latter 2R-1, 3 and 4 are closed only when the winding is energized, while 2R-2 is closed only when it is deenergized.

The apparatus further includes a master switch, not shown, which when closed connects leads L1, L2 and L3 to a three-wire current supply system, and several start and stop switches of the manually pressed push button type. These include start and stop switches 269 and 271 for the hydraulic pump motor; start and stop switches 272 and 273 for the machine cycle; cutting cycle reset switch 270 and loading cycle reset switch 274. The gear cutting machine has a main feed cam, shown diagrammatically at 277 in Fig. 15, which is driven by motor 268 and which serves to withdraw and advance the cylinder of a cylinder-piston device 252 connected to sliding base 42 to permit indexing of the working after each tooth space is cut. During such withdraw and advance the piston and sliding base move as a unit with the cylinder. A normally closed limit switch 278 is opened only when the cam 277 has moved the cylinder to its fully withdrawn position.

*Operation*

The operation of the machine will now be described with reference primarily to the wiring diagram, Fig. 14, and to Fig. 15, in which the development of the valve 76 is related to a cycle diagram which indicates the general shape and phase relationship of the several cams of the loader. When the machine is ready for operation, with a blank workpiece chucked in the work spindle 34 and other blank workpieces in the carrier 45 at the loading station, and also in the several carriers back of it, the machine is started by first closing the master switch to energize leads L1, L2 and L3. The sliding base of the machine will be in its advanced or cutting position, so that switch 264 is closed. The operator momentarily closes push-button start switch 269 which closes a circuit from L1 to L2 through controller winding HM, thereby causing contacts HM-1, 2 and 3 to close. This starts the hydraulic pump motor 251 and establishes a holding shunt around switch 269. Next the operator closes cutting cycle reset push-button switch 270 which closes a circuit from L1 to L2 through automatic stop switch 267 (which is closed at this time) and the relay winding 2R, causing relay contacts 2R-1, 3 and 4 to close and contact 2R-2 to open. Closing of 2R-3 establishes a holding circuit around switch 244. Finally the operator closes automatic cycle start switch 272, which establishes a circuit from L1 to L2 through relay winding 1R inasmuch as switches 274, 273 and 156 and contact HM-3 are all now closed. The energization of winding 1R causes its holding contact 1R-1 to close. The closing of switch 272 also establishes a circuit through winding MM of the controller for the main motor 268 since switch 264 and contact 2R-1 are closed, as is also bore inspection switch 235 providing that the workpiece is properly chucked to the cutting work spindle. Controller contacts MM-1 being closed, the main motor 268 operates the gear cutting machine through its regular cycle, during which all of the teeth of the workpiece are cut. At the conclusion of this cycle automatic stop switch 267 opens momentarily, then recloses. When it opens the relay winding 2R is deenergized so that holding contact 2R-3 and also contacts 2R-1 and 2R-4 open and contact 2R-2 is closed.

The result of opening of contact 2R-1 is the deenergization of winding MM and the consequent stopping of motor 268. There is simultaneous energization of relay winding LM and starting of the loader motor. The latter occurs upon the closing of contact 2R-2 because at this time switch 278 has been closed by the feed cam 277 of the gear cutting machine, switch 246 is being held closed by loader cam 81 and switch 248 is being held closed by loader cam 82.

Figure 15:
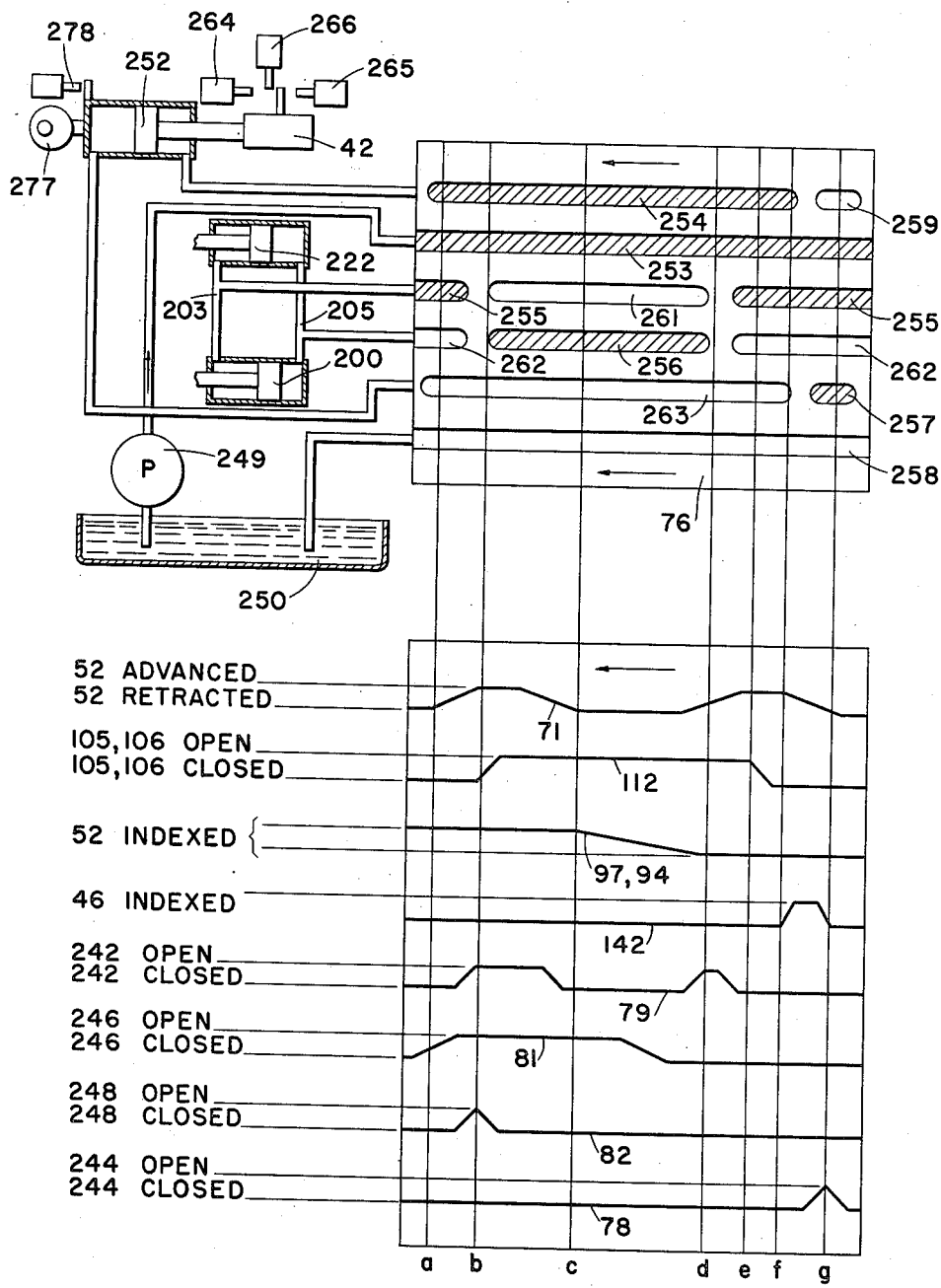
Fig. 15 is a hydraulic circuit and sequence diagram.

The loader motor operates to turn the valve 76 to position a, Fig. 15, in which pressure port 254 and exhaust port 263 are opened to cause piston of device 252 to withdraw the sliding base. In this position a the loader cam 81 opens switch 246, thereby stopping the motor and applying brake 65 until the sliding base is fully withdrawn. At that time the sliding base closes switch 265 and operation of the loader motor resumes, and track 71 of cam 70 moves transfer member 52 axially to cause the loader jaws 105, 106 to envelop the two workpieces on the axes 35 and 54, Fig. 11, it being assumed that at this time there is no workpiece at the chamfering station, on axis 48. The jaws are held open by expanders 109 which are now on the top surfaces of cam formations 112, Fig. 11. The valve 76 is at this time advanced to position b to open ports 261 and 256 and thereby move pistons 200 and 222 to dechucking position. At this position b the loader motor is stopped by opening of switch 248 by cam 82. However when the dechucking stroke of piston 222 is completed switch 234 is closed, restarting the motor. As position b is approached cam 79 opens air valve 242 and cam 72 acts to turn shaft 53 and cams 112, 114 far enough to allow springs 107 to close the loader jaws on the workpieces.

Track 71 of cam 70 now retracts the transfer member, with the two workpieces gripped by the jaws. As the cut workpiece is withdrawn from the cutting machine work spindle the blast of air from conduit 231 cleans the workpiece and the jaws which grip it. As the withdrawal concludes the cam 79 closes air valve 242 and, at position c, the index mechanism comprising drive pin 97 and slotted driven member 94 act to advance the transfer member by 120°.

At the conclusion of this motion the cam 70, 71 again advances the transfer member axially, to insert the blank workpiece taken from the carrier 45 into the chuck of the cutting work spindle and to insert the cut workpiece taken from the cutting work spindle into the chuck of the chamfering device. If there were a cut and chamfered workpiece in the third pair of jaws it would at this time be inserted in the empty carrier 45. At position d, as the blank approaches the chuck of the cutting work spindle, the cam 79 again opens air valve 242 to clean out the bore of the chuck and the shank of the workpiece. As the transfer member approaches its fully advanced position the jaws 105, 106 relax by action of expanders 109 on cam surfaces 113 so that the workpiece is free to center itself in the chuck of the cutting work spindle. The ports 255 and 262 are then connected to the chuck actuating cylinders, so that pistons 200 and 222 act to chuck the workpieces to the cutting and chamfering work spindles. When position e is reached the cam 72 starts to rotate the shaft 53 and thereby cause cam surfaces 114 and expanders 107 to fully open the jaws 105, 106, and at position $f$ retraction of the transfer member 52, which is now free of the workpieces, is commenced by cam 70, 71. At about the same time the index means 128, 129 and cam 70, 142, Figs. 7 and 8, begin to index the sprocket 46 and the chain of carriers 45. At the conclusion of this operation the loader motor is stopped in position $g$ by cam 78 momentarily closing and then reopening switch 244. The momentary closing energizes relay winding 2R, whereupon contact 2R–3 establishes a holding shunt around switch 244. Contact 2R–1 closes and contact 2R–2 opens, deenergizing the loader motor.

Shortly before position $g$ of valve 76 is reached the ports 257 and 259 are opened so that the piston of device 252 acts to advance the sliding base to its cutting position. The loading cycle is now completed.

As the sliding base approaches its cutting position it momentarily closes switch 266 which energizes controller CM for chamfering motor 162, since contact 2R–4 is now closed. Thus the chamfering motor is started and operated far enough for cam 160 to close switch 170. This shunts the switch 266 so that subsequent reopening of the latter has no effect. The chamfering motor continues to operate, causing a chamfering operation succeeded by an indexing operation as has been described previously. During the first indexing operation the cam button 196 will pass from beneath lever 197, and thereby allow the switch 190 to close. This switch shunts the switch 170 so that subsequent opening of the latter is without effect. Hence the chamfering motor will operate through its entire cycle, until all of the teeth of the work gear have been chamfered. This cycle ends when during the indexing following chamfering of the last tooth the switches 170 and 190 are simultaneously open. At this time the switch 266 is also open and hence the chamfering motor is stopped.

Meanwhile the sliding base 42 has reached its fully advanced or cutting position and has closed switch 264, thereby establishing a circuit through now closed contact 2R–1, bore inspection switch 235 and winding MM for main motor 268, thereby starting a new cutting cycle. Thus cutting and chamfering cycles will normally succeed each loading cycle, and vice versa, until the operator stops the machine by opening the main switch or one of switches 269 and 272, or until the machine runs out of blanks. When this occurs a flag 152 will open switch 156 during the phase of the loading cycle, between positions $f$ and $g$ in Fig. 15 when the chain of carriers 45 is being indexed. Opening of switch 156 deenergizes relay 1R whose contact 1R–1 opens to deenergize winding LM of the controller for the loader motor. To restart the machine the start switch 272 must again be depressed after the switch 156 recloses. This is necessary because the holding contact 1R–1 opened when the winding 1R was deenergized.

In the event the operator for any reason wishes to operate the machine through a second loading cycle after one loading cycle has been completed, without there being an intervening cutting cycle, he presses the loader reset switch 274 and then closes the cycle start switch 272. The opening of switch 274 releases the holding circuit (contact 2R–3) around switch 244 and thus the machine operates through a loading cycle just as it would if automatic stop switch 267 had opened momentarily.

Similarly at the conclusion of one cutting cycle the operator may cause the machine to operate through a second cutting cycle without an intervening loading cycle by pressing the cutting reset switch 270. This has the effect of re-establishing the circuit through relay winding 2R, just as though the loading-cycle-end switch 244 had closed.

Ordinarily the teeth of automotive rear axle drive pinions are rough generated and chamfered on one machine and then finish cut on another machine. The present invention applies to both roughing and finishing machines except that, since the step of chamfering is not repeated after finish cutting, the chamfering device will ordinarily be omitted from the finishing machine. Another difference is that in the finishing machine there is the necessity, not existent in the case of the roughing machine, of stock dividing the workpiece prior to chucking it in the cutting work spindle. To accomplish this the stock dividing mechanism shown in Fig. 11, comprising the arm 206, 208, 209, 214, and the associated parts 207, 211 and 213, are mounted on the work head 36 instead of on the housing 157 of the chamfering device.

Figure 21:
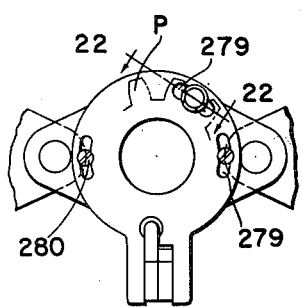
Fig. 21 is a front elevation of a modified form of carrier link of the chain magazine; and, Fig. 22 is a detail sectional view in plane 22—22 of Fig. 21.
Figure 22:
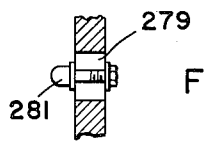
Figures 17, 18:
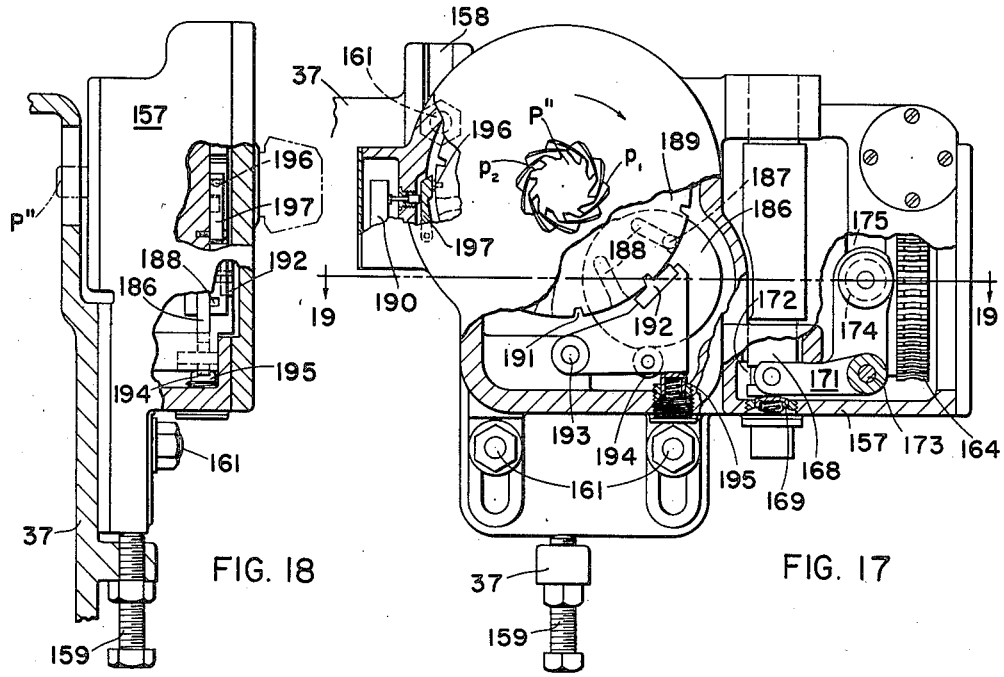
Fig. 17 is a view partly in elevation and partly in vertical section in plane 17—17 of Fig. 16 and in planes parallel thereto.
Fig. 18 is a view in vertical planes perpendicular to Fig. 17.

In order to rough stock divide, to assure the finish stock dividing ball 209 entering the tooth space of the pinion during finish stock division, the carriers 45 are modified in the manner shown in Figs. 21 and 22. The front flange of each carrier is secured to the carrier body by screws 280 which extend through arcuate slots in the flange, enabling angular adjustment of the latter. Each flange also has an arcuate slot 279 through which extends a pin 281 adapted to fit into one tooth space of a work pinion P, the pin being of a diameter slightly smaller than the width of the tooth spaces at the back face of the pinion head.

The pin 281 enters a tooth space when the operator inserts the pinion in the carrier. If the pin is not entered into a tooth space the pinion cannot be inserted into the carrier far enough to allow the flag 152 to be raised to its broken line position in Fig. 3, and hence the flag operated switch 156 will stop the machine before the pinion reaches the loading station. By reason of the arcuate extent of slot 279 the pin 281 can be adjusted for use with workpieces of different tooth number. When necessary this adjustment may be supplemented by angular adjustment of the flanges as enabled by the arcuate slots for screws 280.

Having now described the preferred embodiment and its mode of operation, what we claim as our invention is:

1. A machine tool having a spindle for supporting a workpiece for a work operation, a transfer member rotatable unidirectionally about and translatable along an axis parallel to the spindle and having a plurality of sets of jaws each of which is adapted to engage a workpiece on the spindle in one position of rotation of the transfer member, and an indexible magazine having a plurality of carriers for workpieces, said magazine being so disposed that each indexing operation brings a successive carrier into a position wherein the workpiece supported thereon is parallel to the spindle and engageable by one set of jaws while another set of jaws is engageable with a workpiece on the spindle.

2. A machine tool comprising a frame, a housing journaling a spindle which is adapted to support a workpiece for a work operation, said housing being movable on the frame to carry the spindle between work operation and loading positions, a transfer member mounted on the frame for rotation and also for translation along its axis of rotation, and a magazine comprising a plurality of carriers for workpieces and a rotatively indexible supporting member for said carriers, the axis of the transfer member being parallel to and equally spaced from a workpiece on the spindle when the latter is in loading position and a workpiece on one carrier, and the transfer member having a plurality of sets of jaws of which one is adapted to engage a workpiece on the carrier and another a workpiece on the spindle upon axial advance of the transfer member.

3. A machine according to claim 2 in which there are means to open and close said jaws, and means acting in sequence to ($a$) advance the transfer member axially to cause the jaws thereof to envelop workpieces on the spindle and on said carrier and to close said jaws; ($b$) retract the transfer member axially, rotatively index it and then advance it axially to thereby transfer workpieces from and to the carrier and from and to the spindle; ($c$)

open said jaws and retract the transfer member axially; and (d) index the carrier supporting member of the magazine and advance said housing to move the spindle from the loading position to the work operation position.

4. A gear cutting machine or the like comprising a frame, a housing supporting a first spindle for holding a workpiece for a tooth cutting operation, the housing also supporting a second spindle for holding a workpiece for a tooth chamfering operation, said housing being movable on the frame to carry the first spindle between cutting and loading positions, a magazine comprising a plurality of work carriers and a supporting member for said carriers, said member being rotatable on the frame for indexing the carriers, and a transfer member mounted on the frame for unidirectional rotation and for translation along its axis of rotation, said transfer member having a plurality of equally spaced sets of jaws for engaging and carrying workpieces, said axis being parallel to and equally spaced from the axis of a workpiece on one carrier and from the axes of workpieces on said spindles when the housing is in loading position.

5. A machine according to claim 4 in which there are means to open and close said jaws, first tool means for cutting teeth on a workpiece on the first spindle when the latter is in cutting position, second tool means for chamfering teeth of a workpiece on the second work spindle, and means acting in sequence to (a) withdraw the housing to carry the spindle from the cutting to the loading station; (b) advance the transfer member axially to cause the jaws thereof to envelop and then close upon workpieces that are on said spindles and said carrier (c) retract the transfer member axially, rotatively index it and then advance it axially, to thereby transfer one workpiece from the carrier to the first spindle, a second workpiece from the first spindle to the second spindle, and a third workpiece from the second spindle to the carrier; (d) rotate the supporting member to index the magazine and advance said housing from loading position to cutting position; and (e) operate said tool means.

6. A machine according to claim 5 in which there is a separate indexing mechanism for each of said spindles and means to operate each such mechanism in time with operation of the respective tool means.

7. A machine according to claim 1 in which there is a flag movable on each carrier between two positions, said flag being so positioned as to be moved to one of said two positions by and upon removal of a workpiece from the carrier by said transfer member.

8. A machine according to claim 7 in which there is a means to stop the machine, said means including a member actuated by engagement of said flag therewith upon indexing of the magazine when the flag is in said one position, to thereby prevent accidental repetition of a work operation upon a workpiece.

9. A gear cutting machine having a work holding chuck, a movable transfer member to carry workpieces to and from the chuck, means operating in time with the transfer member to actuate the chuck to grip and release a workpiece that has been entered therein by the transfer member, means including a valve and a passage controlled thereby leading to the chuck for periodically directing a stream of fluid over the work-receiving surfaces of the chuck and over a workpiece carried by said transfer member, and means operating in time with the transfer member for actuating said valve.

10. A machine comprising a housing, a work transfer member rotatable and also axially movable upon the housing, work gripping jaws on the member, means including a first cam mounted for oscillation about the axis of the member for actuating said jaws, an index mechanism to periodically rotate the member, a second cam rotatable in the housing for advancing and retracting the member axially, a third cam rotating as a unit with the second cam for oscillating the first cam, and an element also rotating as a unit with the second cam for actuating said index mechanism.

11. A machine comprising a housing having a spindle journaled therein which is provided with a work holding chuck, a transfer member for carrying toothed workpieces to said chuck, said transfer member having work-gripping jaws thereon, a stock dividing member movable on the housing to effect stock-dividing rotation of a workpiece in said chuck, and means for opening said jaws and concomitantly operating said stock-dividing member.

12. A machine comprising a housing having a spindle journaled therein, said spindle having a chuck for a workpiece, a transfer member having workpiece gripping jaws for carrying a workpiece to the chuck, an element movable upon the transfer member for opening the jaws, a stock-dividing member movable on the housing to rotate the workpiece in the chuck into a predetermined angular position therein, and parts associated respectively with said element and said stock-dividing member for operating the latter upon jaw opening motion of said element, said parts being brought into interengageable relationship by and upon the movement of the transfer member in which a workpiece is carried to the chuck.

13. A machine comprising a frame, a pair of spindles supported by the frame and each having a work holding chuck thereon, a transfer member mounted for rotation relative to the frame and also for axial motion along its axis of rotation to withdraw a workpiece from one chuck, then rotate to align the workpiece with the other chuck, and then insert the workpiece in said other chuck, the transfer member having work-gripping jaws thereon, means for opening said jaws comprising an element movable radially upon the transfer member and an actuating cam therefor which is coaxial with said axis of rotation, a stock-dividing member pivoted to the frame for engaging tooth surfaces of a workpiece in said other chuck for turning the latter into a predetermined angular position, and parts associated respectively with said element and with the stock-dividing member for actuating the latter by and upon jaw-opening motion of said element, said parts being brought into interengageable relation upon movement of the transfer member to insert the workpiece in said other chuck.

References Cited in the file of this patent

UNITED STATES PATENTS

| | | |
|---|---|---|
| 1,218,987 | Drake | Mar. 13, 1917 |
| 1,593,825 | Higgins | July 27, 1926 |
| 1,985,409 | Hill | Dec. 25, 1934 |
| 2,059,710 | Rupple | Nov. 3, 1936 |
| 2,078,124 | Condon | Apr. 20, 1937 |
| 2,304,148 | Carlsen | Dec. 8, 1942 |
| 2,382,013 | King | Aug. 14, 1945 |
| 2,589,475 | Carlsen et al. | Mar. 18, 1952 |